United States Patent [19]
Shirley et al.

[11] Patent Number: 5,493,869
[45] Date of Patent: Feb. 27, 1996

[54] RECOVERY OF AT LEAST TWO DIFFERENT AND INCOMPATIBLE REFRIGERANT TYPES

[75] Inventors: Roger D. Shirley, W. Unity; Gary P. Murray, Montpelier; Kenneth W. Manz, Paulding, all of Ohio

[73] Assignee: SPX Corporation, Muskegon, Mich.

[21] Appl. No.: 357,929

[22] Filed: Dec. 16, 1994

[51] Int. Cl.⁶ .................................... F25B 45/00
[52] U.S. Cl. ............................... 62/149; 62/292; 141/248
[58] Field of Search ................................. 62/77, 85, 149, 62/292, 475, 335; 141/248

[56] References Cited

U.S. PATENT DOCUMENTS

| | | |
|---|---|---|
| 4,768,347 | 9/1988 | Manz et al. . |
| 4,805,416 | 2/1989 | Manz et al. . |
| 4,939,905 | 7/1990 | Manz . |
| 5,005,369 | 4/1991 | Manz . |
| 5,095,713 | 3/1992 | Laukhuf et al. . |
| 5,127,239 | 7/1992 | Manz et al. . |
| 5,165,253 | 11/1992 | Kamegasawa et al. ................. 62/292 |
| 5,172,562 | 12/1992 | Manz et al. . |

OTHER PUBLICATIONS

American TheraFlo Corporation advertisement on "OZsaver Cycler Model 18000," appearing in Chilton's *Motor Age* Magazine, p. 43, Apr. 1994.

Primary Examiner—John M. Sollecito
Attorney, Agent, or Firm—Barnes, Kisselle, Raisch, Choate, Whittemore & Hulbert

[57] ABSTRACT

A system for recovering at least two different and incompatible types of refrigerant that includes a compressor having an inlet for connection through first and second parallel inlet paths to equipment under service, and an outlet for connection through first and second parallel outlet paths to refrigerant storage containers. The first inlet and outlet paths terminate in connector fittings of a first configuration, and the second inlet and outlet paths terminate in connector fittings of a second configuration different from the first. Solenoid valves are associated with the inlet and outlet paths, and are actuated alternately so that the inlet and outlet paths are not simultaneously connected to the compressor. The connector fittings are mounted on a panel that has a sliding door for selectively exposing either but not both sets of connector fittings. The chance of misconnection and mixing refrigerant types is thereby reduced.

11 Claims, 3 Drawing Sheets

RECOVERY OF AT LEAST TWO DIFFERENT AND INCOMPATIBLE REFRIGERANT TYPES

The present invention is directed to systems for recovering refrigerant from refrigeration equipment (such as air conditioning and heat pump equipment) for storage and reuse, and more particularly to a system for recovering at least two different and incompatible types of refrigerant.

BACKGROUND AND OBJECTS OF THE INVENTION

It is now widely recognized and accepted that release into the atmosphere of chlorofluorocarbon(CFC)-based refrigerants, such as refrigerant R12, has a deleterious effect upon the ozone layer that surrounds the earth. Production of CFC-based refrigerants has been severely curtailed, and the cost of refrigerant for service purposes is increasing. It is therefore standard practice in the refrigeration system service industry to recover, purify and (recycle or reclaim) re-use refrigerant, rather than merely to vent such refrigerant into the atmosphere and replace with new refrigerant as had been common practice in the past. U.S. Pat. Nos. 4,768,347, 4,805,416, 4,939,905, 5,005,369, 5,095,713 and 5,127,239, all assigned to the assignee hereof, disclose equipment for recovering, purifying and/or recharging refrigerant in a refrigeration system service environment.

As currently envisioned, R12 refrigerant will eventually be replaced by different types of refrigerant in production of new refrigeration systems. For example, R12 refrigerant is being replaced by R134a refrigerant in the automotive industry—i.e., in automotive air conditioning systems. However, because these refrigerants and their associated lubricants are chemically incompatible with each other, inadvertent mixture of even small amounts of the different refrigerants can cause severe damage to and early failure of the refrigeration system. SAE specifications require different service fittings on automotive air conditioning systems using different types of refrigerants—i.e., ¼-inch flare fittings on R12 equipment and ½-inch acme fittings on R134a equipment. However, the use of adapters in the service industry may still result in inadvertent mixing of refrigerant/lubricant types, with consequent damage to the system under service or to the service equipment itself.

There is therefore a need in the refrigerant service industry, particularly the automotive air conditioning system service industry, for refrigerant recovery equipment that is particularly designed and adapted to reduce likelihood of inadvertent mixing of incompatible refrigerant types. It is a general object of the present invention to provide such equipment.

SUMMARY OF THE INVENTION

A system for recovering at least two different and incompatible types of refrigerant in accordance with the present invention includes a refrigerant pump, and a first inlet path with a first inlet connector connected in parallel with a second inlet path having a second inlet connector to the inlet of the refrigerant pump. A first outlet path having a first outlet connector and a second outlet path having a second outlet connector are connected in parallel to the outlet of the refrigerant pump. In accordance with a first aspect of the present invention, each of the inlet and outlet connectors is associated with a valve mechanism, and the inlet and outlet valves are connected to a switch mechanism for operating the valves in a first mode in which all of the valves are closed, a second mode in which the first inlet and outlet valves are open while the second inlet and outlet valves are closed, and a third mode in which the second inlet and outlet valves are open while the first inlet and outlet valves are closed. In this way, the first and second valve sets are never open simultaneously, and the associated inlet and outlet valve sets are operated in unison. The valves may comprise either separate valves or three-way valves having a closed center position.

In accordance with a second aspect of the present invention, the first inlet and outlet connectors are of a first configuration, and the second inlet and outlet connectors are of a second configuration different from the first configuration. For example, in automotive service applications, the first inlet and outlet connectors may comprise ¼-inch flare fittings, while the second inlet and outlet connectors may comprise ½-inch acme fittings. The connector fittings are mounted on a panel, on which a door is mounted for selectively and alternately exposing either the first inlet and outlet connector fittings, or the second inlet and outlet connector fittings, for connection to the equipment under service and to an associated storage container. In this way, the door ensures that the two sets of connector fittings are exposed alternately, and not at the same time, thereby reducing likelihood of misconnection. A switch preferably is disposed adjacent to the door, and is responsive to movement of the door between fitting-exposing positions for automatically clearing the refrigerant recovery equipment preparatory to use with a differing type of refrigerant.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
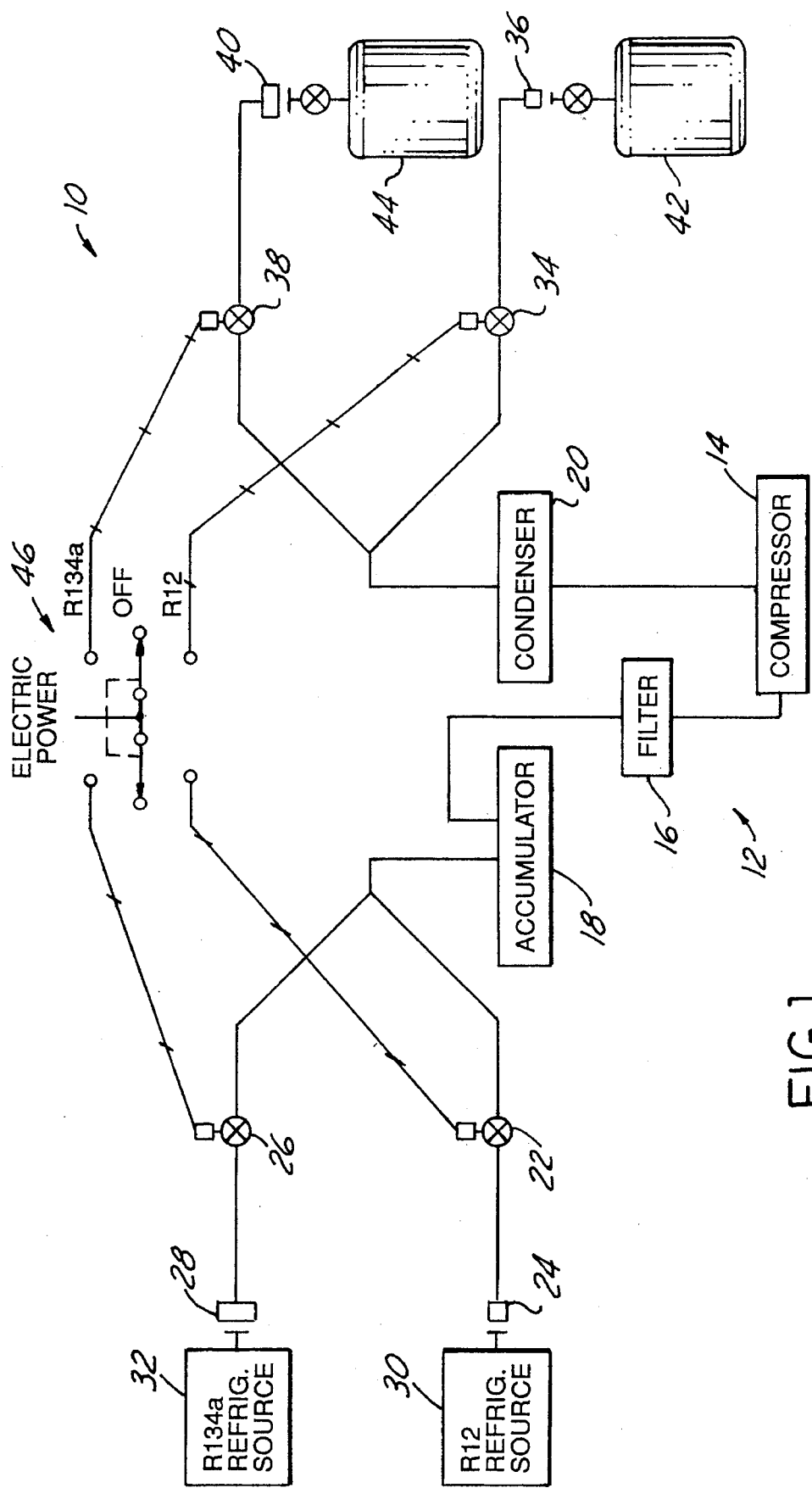
FIG. 1 is a schematic diagram of a refrigerant recovery system in accordance with one presently preferred embodiment of the invention.

FIG. 1 illustrates a refrigerant recovery system 10 in accordance with one presently preferred embodiment of the invention as comprising a refrigerant pump 12 in the form of a compressor 14 having an inlet for receiving refrigerant through a filter 16 and an accumulator/oil separator 18, and an outlet for feeding refrigerant through a condenser 20. The inlet side of accumulator 18 is connected through a first solenoid valve 22 to a first inlet connector fitting 24, and through a second solenoid valve 26 to a second inlet connector fitting 28. Inlet connector fittings 24,28 preferably are of differing configuration, such as a ¼-inch flare at connector fitting 24 for connection to an R12 refrigerant source 30 and a ½-inch acme connector fitting 28 for connection to an R134a refrigerant source 32. The outlet side of condenser 20 is connected through a first outlet solenoid valve 34 to a first outlet connector fitting 36, and through a second outlet solenoid valve 38 to a second outlet connector fitting 40. Once again, outlet connector fittings 36,40 are of differing configuration for connection to associated refrigerant storage containers 42,44.

Solenoid valves 22,26,34,38 are connected to respective normally open contacts of a two-pole three-position electrical switch 46. The common contacts of switch 46 are connected to electrical power. Switch 46 preferably comprises a two-pole rocker switch having a first or center OFF position in which electrical power is not applied to any solenoid valve, a second R12 position in which electrical power is applied to solenoid valves 22,34, and a third R134a position in which electrical power is applied to solenoid valves 26,38. In this way, the inlet and outlet valves for each refrigerant type are actuated in unison, and neither the inlet nor the outlet valves for either refrigerant type are ever actuated simultaneously. This valve and control arrangement, particularly in combination with the differing connector fitting configurations, helps prevent inadvertent mixing of refrigerants in either pump 12 or storage containers 42,44.

Figure 2:
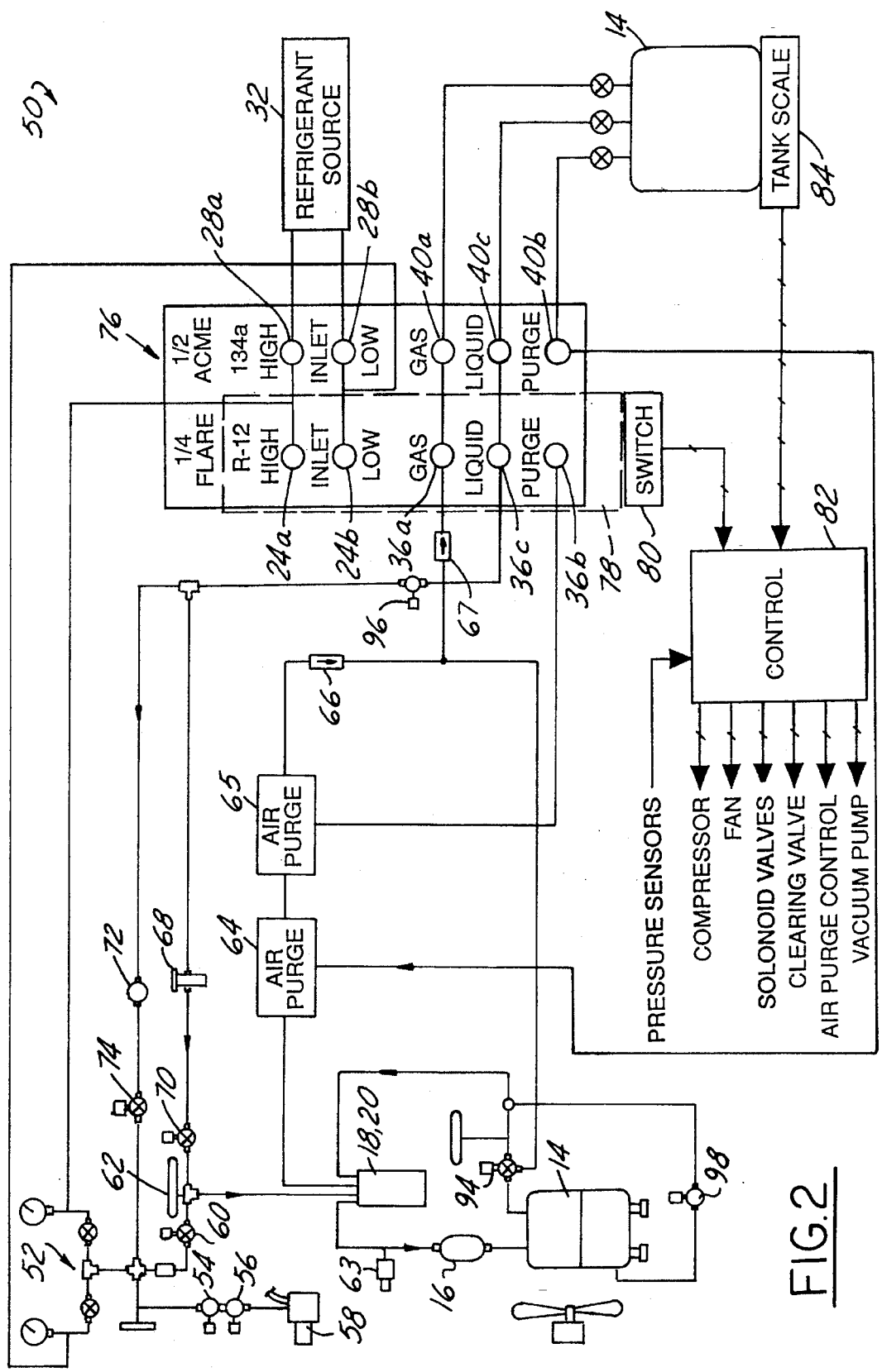
FIG. 2 is a schematic diagram of a refrigerant recovery, recycling and recharging system in accordance with a second embodiment of the invention.

FIG. 2 illustrates a refrigerant recovery, recycling and recharging system 50 in accordance with a second embodiment of the invention. A manifold 52 has lines for connection to the high and low sides of a refrigerant source, either through inlet connection fittings 28a,28b for an R134a refrigerant source 32, or through inlet connection fittings 24a,24b for an R12 refrigerant source (not shown in FIG. 2). Manifold 52 is connected through vacuum solenoid valves 54,56 to a vacuum pump 58. Manifold 52 is also connected through a recovery solenoid valve 60, a pressure sensor 62, a combined heat-exchange/oil-separation unit 18,20 and filter/dryer 16 to the inlet of compressor 14. A service port 63 is provided between unit 18,20 and filter/dryer 16. The outlet of compressor 14 is connected through heat-exchange/oil-separation unit 18,20, a pair of manual or automatic devices 64,65 for purging air and other non-condensibles, and through check valves 66,67 to the outlet connector fitting 40a connected to the vapor port of storage container 44.

The purge port of container 44 is connected through connector fitting 40b to air purge device 64 for R134a refrigerant, and the liquid port of container 44 is connected through connector fitting 40c to an expansion valve 68 and a recycle/purification solenoid valve 70 to the inlet side of heat-exchange/oil-separation unit 18,20. Liquid connector fitting 40c is also connected through a moisture indicator 72 and a solenoid valve 74 for recharging the equipment under service. With the exception of fitting connector panel 76 and associated connections to be described, system 50 is basically the same as that disclosed in U.S. Pat. No. 5,172,562, to which reference is made for more detailed discussion. The junction of check valves 66,67 is connected to a diversion solenoid valve 94. A liquid clearing solenoid valve 96 is connected between liquid fittings 36c,40c and moisture indicator 72. A pressure equalization and oil return solenoid valve 98 is connected across compressor 14.

At panel 76, the high side of manifold 52 is connected to HIGH side inlet connector fittings 24a,24a, and the low side of manifold 52 is connected to the LOW side inlet connector fittings 24b and 28b. The GAS fittings 36a,40a are connected in parallel, the LIQUID port fittings 36c and 40c are connected in parallel on panel 76, and PURGE port fittings 36b and 40b are connected to purge devices 65,64 for R12 refrigerant and R134a refrigerant respectively. A door 78 is slidably mounted adjacent to panel 76 for movement between a position blocking the R12 inlet and outlet fittings while exposing the R134a inlet and outlet fittings (as shown), and a position blocking the R134a fittings while exposing the R12 fittings. A switch 80 is disposed adjacent to panel 76, and is responsive to position of door 78 for indicating to the control electronics 82 the door position—i.e., exposing either the R12 inlet and outlet fittings or the R134a inlet and outlet fittings. Control electronics 82 is responsive to a change in door position for automatically initiating a clearing operation. Diversion valve 94 is operated by control electronics to connect the outlet of compressor 14 to GAS fittings 36a,40a through check valve 67. Check valve 66 prevents reverse flow to purge devices 64,65. Valve 98 is opened, valve 96 is closed, valves 74,60 are opened, and the valves at manifold 52 are closed. Compressor 14 is operated to clear the system components. When sensor 62 indicates a reasonable vacuum level (e.g., seventeen inches of mercury vacuum), vacuum pump 58 is activated to clear the unit further with all solenoid valves closed except valve 96. Storage container 44 rests on a scale 84, which is coupled to control 82 to terminate refrigerant recovery in the event of a full-container condition.

Figure 3:
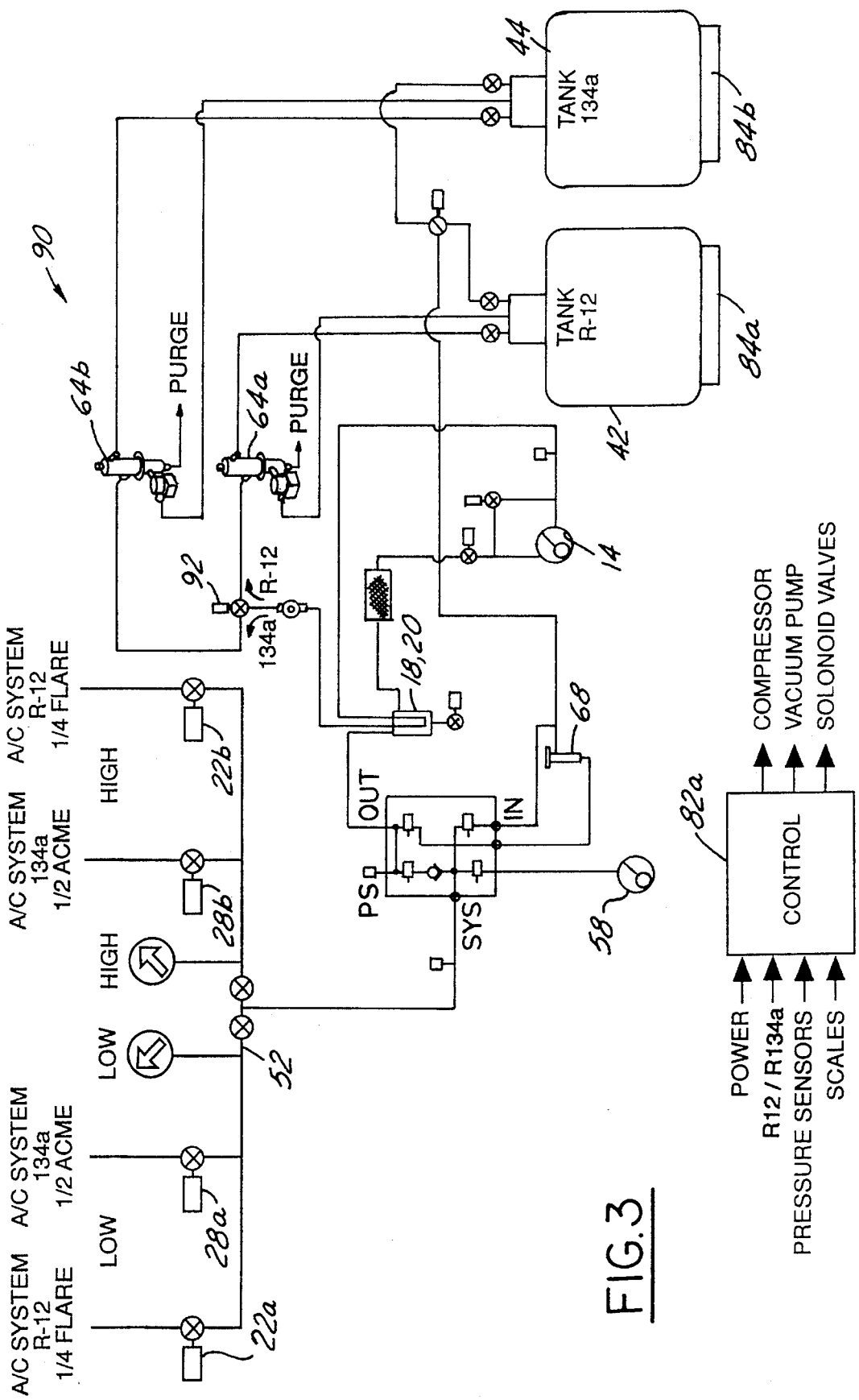
FIG. 3 is a schematic diagram of a refrigerant recovery, recycling and recharging system in accordance with the third embodiment of the invention.

FIG. 3 illustrates a refrigerant recovery/recycling/recharging system 90 in accordance with a third embodiment of the invention. Reference numerals identical to those employed in connection with FIGS. 1 and 2 indicate identical elements or parts, and identical reference numerals with a letter suffix indicate functionally similar elements or parts. Basically, system 90 of FIG. 3 combines systems 10,50 of FIGS. 1 and 2, having alternately energized sets of inlet solenoid valves 22a,22b and 28a,28b for R12 and R134 refrigerant respectively, and combining separate outlet valves 34,38 (FIG. 1) into a three-way solenoid-operated outlet valve 92. Valve 92 is normally closed, and may be energized either simultaneously with R12 inlet valves 22a,22b for feeding refrigerant through automatic purge valve 64a to R12 storage container 42, or simultaneously with R134a inlet solenoid valves 28a,28b to feed refrigerant through automatic purge valve 64b to R134a storage container 44. Each container 42,44 is mounted on an associated scale 84a,84b for terminating operation and control electronics 82a in the event that the selected storage container is filled to capacity. Solenoid valves 22a,22b,28a,28b and 92, together with the other flow control solenoid valves illustrated in FIG. 3, are controlled by control electronics 82a as a function of operator input from an R12/R134a selector switch, as well as inputs from the other sensors, etc.

We claim:

1. A system for recovering at least two different and incompatible types of refrigerant comprising:

refrigerant pump means having an inlet and an outlet, first inlet means having first inlet connection means and first inlet valve means for connecting said inlet of said pump means to a source of one of said refrigerant types, second inlet means having second inlet valve means and second inlet connection means for connecting said inlet of said pump means to a source of another of said refrigerant types, first outlet means having first outlet connection means and first outlet valve means for connecting said outlet of said pump means to first refrigerant storage means, second outlet means having second outlet connection means and second outlet valve means for connecting said outlet of said pump means to second refrigerant storage means, and means for simultaneously operating said first and second inlet valve means, and said first and second outlet valve means, in a first mode in which all of said valve means are closed, a second mode in which said first inlet and outlet valve means are open and said second inlet and outlet valve means are closed, and a third mode in which said second inlet and outlet valve means are open and said first inlet and outlet valve means are closed, said first and second inlet and outlet valve means comprising electrically operated valve means, and said valve-operating means comprising switch means responsive to an operator for selecting one of said first, second and third modes of operation.

2. The system set forth in claim 1 wherein said switch means comprises a three-position switch having a first position in which electrical power is isolated from said valve means, a second position in which electrical power is applied to said first inlet and outlet valve means to close said first inlet and outlet valve means, and a third position in which electrical power is applied to said second inlet and outlet valve means to close said second inlet and outlet valve means.

3. The system set forth in claim 1 wherein said first and second inlet and outlet valve means comprise respective separate valve means.

4. The system set forth in claim 1 wherein said first and second outlet valve means comprise a three-way electrically operated valve having a first position in which said outlet of said pump means is isolated from said first and second outlet connection means, a second position in which said outlet from said pump means is connected to said first outlet connection means, and a third position in which said outlet for said pump means is connected to said second outlet connection means.

5. The system set forth in claim 1 wherein said first inlet and outlet connection means are of a first configuration, and wherein said second inlet and outlet connection means are of a second configuration different from said first configuration.

6. The system set forth in claim 5 wherein said first inlet and outlet connection means, and said second inlet and outlet connection means are mounted adjacent to each other on a panel, and wherein said system further comprises means mounted on said panel for movement by an operator to expose either said first inlet and outlet connection means or said second inlet and outlet connection means.

7. The system set forth in claim 6 wherein said switch means is mounted adjacent to said panel and responsive to positioning of said panel-mounted means by an operator for selecting one of said second and third modes of operation as a function of which said connection means are exposed by said panel-mounted means.

8. The system set forth in claim 7 further comprising means responsive to said switch means for automatically clearing refrigerant from said pump means responsive to movement of said panel-mounted means to expose one or the other set of said inlet and outlet connection means.

9. The system set forth in claim 1 wherein said refrigerant pump means comprises a compressor having an inlet and an outlet, means for connecting said compressor inlet to said first and second inlet means, and condenser means for connecting said compressor outlet to said first and second outlet means and at least partially condensing refrigerant passing therethrough from said compressor outlet to said first and second outlet means.

10. A system for recovering at least two different and incompatible types of refrigerant comprising:

refrigerant pump means having an inlet and an outlet, first inlet means having first inlet connection means for connecting said inlet of said pump means to a source of one of said refrigerant types, second inlet means having second inlet connection means of configuration different from said first inlet connection means for connecting said inlet of said pump means to a source of another of said refrigerant types, first outlet means having first outlet connection means for connecting said outlet of said pump means to first refrigerant storage means, second outlet means having second outlet connection means of configuration different from said first outlet connection means from connecting said outlet of said pump means to second refrigerant storage means, a panel on which said first and second inlet and outlet connection means are mounted, and means mounted on said panel for selectively and alternately exposing either said first inlet and outlet connection means or said second inlet and outlet connection means for connection to the associated storage means.

11. The system set forth in claim 10 further comprising switch means mounted adjacent to said panel and responsive to position of said panel-mounted means, and means responsive to said switch means for automatically clearing refrigerant from said pump means responsive to movement of said panel-mounted means to expose one or the other set of said inlet and outlet connection means.

* * * * *